(12) United States Patent
Wu

(10) Patent No.: US 10,856,343 B2
(45) Date of Patent: Dec. 1, 2020

(54) DEVICE AND METHOD OF HANDLING FULL CONFIGURATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 34 days.

(21) Appl. No.: 16/170,001

(22) Filed: Oct. 24, 2018

(65) Prior Publication Data

US 2019/0132891 A1    May 2, 2019

Related U.S. Application Data

(60) Provisional application No. 62/577,724, filed on Oct. 27, 2017, provisional application No. 62/587,485, filed on Nov. 17, 2017, provisional application No. 62/613,375, filed on Jan. 3, 2018.

(51) Int. Cl.
| | |
|---|---|
| *H04W 4/00* | (2018.01) |
| *H04W 76/11* | (2018.01) |
| *H04W 76/27* | (2018.01) |
| *H04W 4/50* | (2018.01) |
| *H04W 80/08* | (2009.01) |
| *H04W 76/00* | (2018.01) |
| *H04W 76/32* | (2018.01) |
| *H04W 80/02* | (2009.01) |

(52) U.S. Cl.
CPC ............. *H04W 76/11* (2018.02); *H04W 4/50* (2018.02); *H04W 76/00* (2013.01); *H04W 76/27* (2018.02); *H04W 76/32* (2018.02); *H04W 80/08* (2013.01); *H04W 80/02* (2013.01)

(58) Field of Classification Search
CPC ..... H04W 76/00; H04W 76/11; H04W 76/27; H04W 76/32
See application file for complete search history.

(56) References Cited

U.S. PATENT DOCUMENTS

| | | | | |
|---|---|---|---|---|
| 2017/0353992 | A1* | 12/2017 | Quan | H04W 76/20 |
| 2018/0083688 | A1* | 3/2018 | Agiwal | H04W 76/19 |
| 2019/0029057 | A1* | 1/2019 | Pan | H04W 76/00 |
| 2019/0166646 | A1* | 5/2019 | Shih | H04W 76/19 |

OTHER PUBLICATIONS

3GPP TS 23.502 V15.0.0 (Dec. 2017).

(Continued)

*Primary Examiner* — Bo Hui A Zhu
(74) *Attorney, Agent, or Firm* — Winston Hsu

(57) ABSTRACT

A communication device releasing a first service data adaptation protocol entity associated to a first data radio bearer (DRB) identified by a first DRB ID and associated to a packet data unit (PDU) session identified by a PDU session identity (ID) and releasing at least one of a first packet data convergence protocol entity associated to the first DRB, a first radio link control entity associated to the first DRB and a first logical channel associated to the first DRB, when a RRC message indicates a full configuration and comprises a first DRB configuration, wherein the first DRB configuration comprises a second DRB ID and the PDU session ID; adding a second DRB according to the first DRB configuration and associating the second DRB to the PDU session; and communicating first data on the second DRB.

10 Claims, 3 Drawing Sheets

(56) References Cited

OTHER PUBLICATIONS

3GPP TS 36.331 V14.4.0 (Sep. 2017).
3GPP TS 38.331 V0.1.0 (Oct. 2017).
Search Report dated Mar. 7, 2019 for EP application No. 18202721.9, pp. 1-4.
Samsung, "Re-configuration scenarios for the NR QoS framework", 3GPP TSG-RAN WG2 #99, R2-1707674, Aug. 21-25, 2017, Berlin, Germany, XP051317637, pp. 1-5.
Huawei, "SDAP (Re)Configuration", 3GPP TSG-RAN WG2 Meeting #99bis, R2-1710227, Oct. 9-13, 2017, Prague, Czech Republic, XP051354797, pp. 1-3.
Nokia et al., DRB re-setup in Full configuration, 3GPP TSG-RAN WG2 Meeting #94 R2-163896 Nanjing, China, May 23-27, 2016.
3GPP TS 38.413 V0.3.0(Aug. 2017), 3rd Generation Partnership Project; Technical Specification Group Radio Access Network; NG Radio Access Network (NG-RAN); NG Application Protocol (NGAP) (Release 15), pp. 1-85.
Office action dated Sep. 4, 2019 for the Taiwan application No. 107137837, filing date Oct. 25, 2018, pp. 1-16.

\* cited by examiner

DEVICE AND METHOD OF HANDLING FULL CONFIGURATION

CROSS REFERENCE TO RELATED APPLICATIONS

This application claims the benefits of U.S. Provisional Applications No. 62/577,724, filed on Oct. 27, 2017, No. 62/587,485, filed on Nov. 17, 2017, and No. 62/613,375, filed on Jan. 3, 2018, which are incorporated herein by reference.

BACKGROUND OF THE INVENTION

1. Field of the Invention

The present invention relates to a communication device and a method used in a wireless communication system, and more particularly, to a communication device and a method of handling full configuration.

2. Description of the Prior Art

A user equipment (UE) communicates with a network, and receives a full configuration indication from the network. However, it is unknown about operations the UE performs in response to the full configuration indication. Thus, communication after receiving the full configuration indication between the UE and the network may be interrupted.

SUMMARY OF THE INVENTION

The present invention therefore provides a method and related communication device for handling a full configuration to solve the abovementioned problem.

A communication device establishing a packet data unit (PDU) session identified by a PDU session identity (ID) with a first network node; being configured with a first data radio bearer (DRB) identified by a first DRB ID and associated to the PDU Session or the PDU session ID, by a first base station (BS) connecting to the first network node; receiving a radio resource control (RRC) message from the first BS; releasing a first service data adaptation protocol entity associated to the first DRB and releasing at least one of a first packet data convergence protocol entity associated to the first DRB, a first radio link control entity associated to the first DRB and a first logical channel associated to the first DRB, when the RRC message indicates a full configuration and comprises a first DRB configuration, wherein the first DRB configuration comprises a second DRB ID and the PDU session ID; adding a second DRB according to the first DRB configuration and associating the second DRB to the PDU session; and communicating first data on the second DRB.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
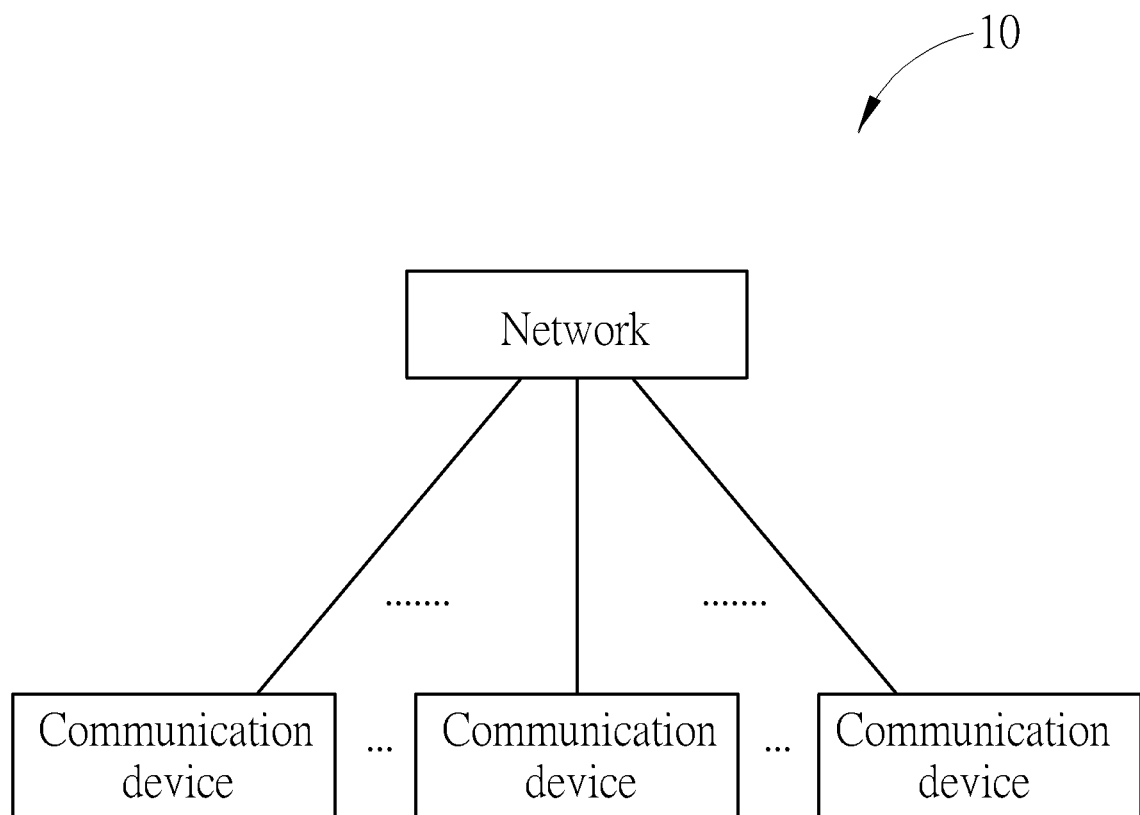
FIG. 1 is a schematic diagram of a wireless communication system according to an example of the present invention.

In FIG. 1, the wireless communication system 10 is briefly composed of a network and a plurality of communication devices. The network and the communication device may (e.g., simultaneously) communicate with each other via one or more carriers in the same or different duplexing modes (e.g., frequency-division duplexing (FDD), time-division duplexing (TDD) or flexible duplexing). The abovementioned cells may be operated according to the same radio access technology (RAT) or different RATs. The RATs may be evolved universal terrestrial radio access network (E-UTRAN), fifth generation (5G) (or called New Radio or NR) or sixth generation (6G).

Practically, the network in FIG. 1 may be an E-UTRAN including at least one evolved long term evolution (LTE) (eLTE) evolved Node-B (eNB). The network may include a new radio (NR)/next generation (NextGen) network including at least one 5G base station (BS) (or called gNB), an evolved gNB (egNB) or a 6G BS. In general, a BS may also be used to refer any of the eNB, the gNB, the egNB and the 6G BS.

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for a uplink, the communication device is the transmitter and the network is the receiver, and for a downlink, the network is the transmitter and the communication device is the receiver.

Figure 2:
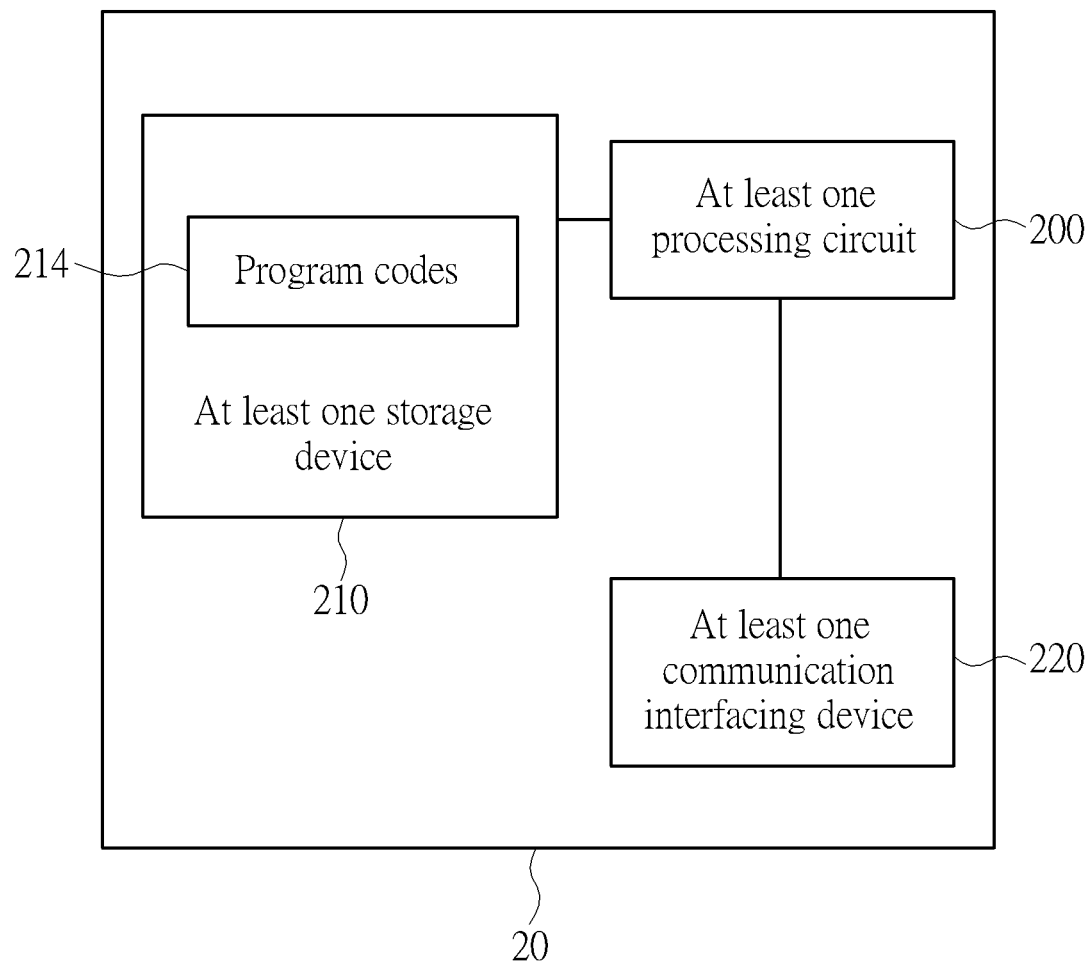
FIG. 2 is a schematic diagram of a communication device according to an example of the present invention.

FIG. 2 is a schematic diagram of a communication device 20 according to an example of the present invention. The communication device 20 may be the communication device, and/or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device in FIG. 1, to simplify the illustration of the embodiments.

Figure 3:
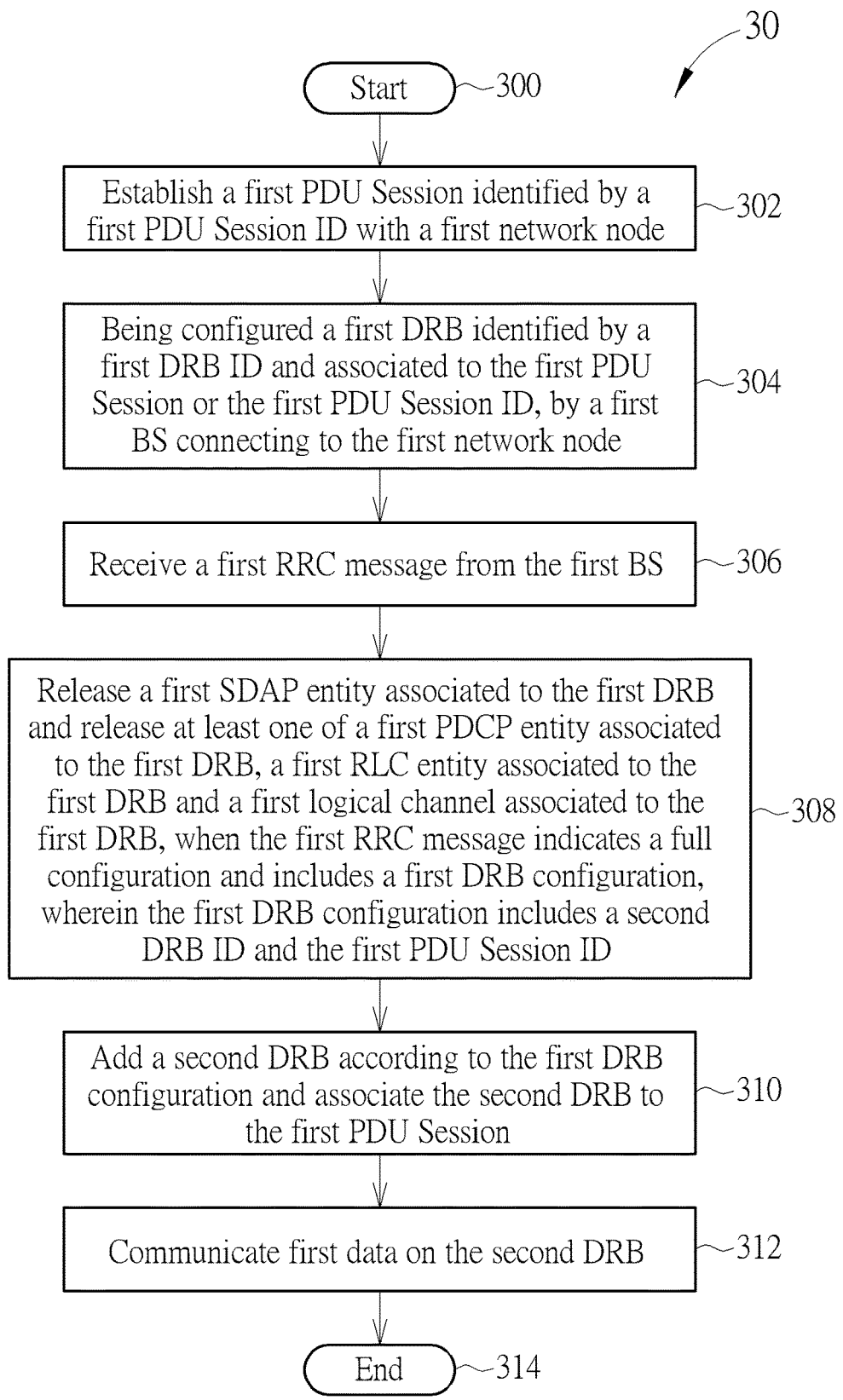
FIG. 3 is a flowchart of a process according to an example of the present invention.

A process 30 in FIG. 3 according to an example of the present invention may be utilized in a UE, and includes the following steps:

Step 300: Start.

Step 302: Establish a first packet data unit (PDU) Session identified by a first PDU Session identity (ID) with a first network node (e.g., the network in FIG. 1).

Step 304: Being configured with a first data radio bearer (DRB) identified by a first DRB ID and associated to the first PDU Session or the first PDU Session ID, by a first BS connecting to the first network node.

Step 306: Receive a first radio resource control (RRC) message from the first BS.

Step 308: Release a first service data adaptation protocol (SDAP) entity associated to the first DRB and release at least one of a first packet data convergence protocol (PDCP) entity associated to the first DRB, a first radio link control (RLC) entity associated to the first DRB and a first logical channel associated to the first DRB, when the first RRC message indicates a full configuration and includes a first DRB configuration, wherein the first DRB configuration includes a second DRB ID and the first PDU Session ID.

Step 310: Add (e.g., configure, establish or setup) a second DRB according to the first DRB configuration and associate the second DRB to the first PDU Session.

Step 312: Communicate first data on the second DRB.

Step 314: End.

According to the process 30, the UE transmits the first data associated to the first PDU Session on the second DRB and/or receiving the first data associated to the first PDU Session on the second DRB in response to the indication indicating the full configuration. Thus, communication of data associated to the first PDU Session is not interrupted due to the full configuration. The first data may include a plurality of PDUs of a protocol layer (e.g., PDCP or SDAP).

In one example, the UE adds (e.g., configures, establishes, setups) the second DRB according to the first DRB configuration by configuring (e.g., setting up, establishing, initializing) a second SDAP entity associated to the second DRB and by configuring at least one of a second PDCP entity associated to the second DRB, a second RLC entity associated to the second DRB and a second logical channel associated to the second DRB. The second SDAP entity, the second PDCP entity, the second RLC entity and/or the second logical channel may be the same as or different from the first SDAP entity, the first RLC entity, the first logical channel and/or the first PDCP entity. When establishing an entity described above, the UE initializes state(s) or variable(s) used by the entity to initial state(s) or initial value(s).

In one example, the UE transmits a PDU Session Establishment Request message to the first network node (e.g., Access and Mobility Management Function (AMF)) to establish the first PDU Session. The UE may determine the first PDU Session ID, and may include the first PDU Session ID in the PDU Session Establishment Request message. The UE may receive a PDU Session Establishment Accept message for responding to the PDU Session Establishment Request message, from the first network node. The PDU Session Establishment Accept message may or may not include the first PDU Session ID.

In one example, the PDU Session Establishment Accept message includes a first Evolved Packet System (EPS) bearer ID associated to the first PDU Session (or the first PDU Session ID). In one example, the first network node transmits a Non-Access-Stratum (NAS) message (e.g., a UE configuration update command) to the UE, to configure the first EPS bearer ID associated to the first PDU Session (or the first PDU Session ID).

In one example, the second DRB ID is the same as the first DRB ID, or is different from the first DRB ID.

In one example, the first RRC message configures the UE to hand over to a cell of a second BS. The UE transmits a first RRC complete message to the second BS via the cell, in response to the first RRC message. The UE communicates the first data (e.g., internet protocol (IP) packets or PDCP PDUs)) with the second BS (e.g., transmits the first data to the second BS and/or receives the first data from the second BS) on the second DRB via the cell. In another example, the first RRC message does not configure the UE to perform hand over and the UE transmits a first RRC complete message to the first BS in response to the first RRC message.

In one example, the first RRC message is received after (e.g., following) a RRC reestablishment procedure initiated by the UE with the first BS. The UE may transmit a first RRC complete message to the first BS, in response to the first RRC message. The UE may communicate the first data (e.g., IP packets or PDCP PDUs) with the first BS (e.g., transmits the first data to the first BS and/or receives the first data from the first BS) on the second DRB.

In one example, the UE receives a second RRC message configuring the first DRB from a BS (e.g., the first BS or a third BS), before receiving the first RRC message. The second RRC message may include a second DRB configuration including the first DRB ID and the first PDU session ID. The UE may transmit a second RRC complete message to the BS, in response to the second RRC message. The UE adds (e.g., configures, establishes, setups) the first DRB according to the second DRB configuration, and associates the first DRB to the first PDU Session. The UE communicates second data associated with the first PDU session with the BS (e.g., transmits the second data to the BS and/or receives the second data from the BS) on the first DRB.

In one example, the first RRC message may not include the first EPS bearer ID, and may include a SDAP configuration. The second RRC message may not include the first EPS bearer ID, and may include a SDAP configuration. The first RRC message may include a full configuration flag/indication indicating the full configuration. The second RRC message may or may not include the full configuration flag/indication.

In one example, the UE establishes a second PDU Session identified by a second PDU Session ID with the first network node, and setups a third DRB associated to the second PDU Session and identified by a third DRB ID. If the first RRC message does not configure any DRB associated to the second PDU Session or does not include the second PDU Session ID (i.e., no DRB configuration includes the second PDU Session ID), the UE may or may not release the second PDU Session in response to the first RRC message. If the first RRC message include a third DRB configuration, and the third DRB configuration configures a fourth DRB and includes the second PDU Session ID and a fourth DRB ID of the fourth DRB, the UE performs operations for the third DRB and the fourth DRB similar to the operations for the first DRB and the second DRB. The fourth DRB is associated to the second PDU Session.

In one example, the UE establishes an EPS bearer (context) identified by a second EPS bearer ID with a second network node. The UE is configured with a fifth DRB identified by a fifth DRB ID and associated to the EPS bearer or the second EPS bearer ID, by a fourth BS connecting to the second network node. The UE receives a third RRC message from the fourth BS. The UE releases at least one of a third PDCP entity associated to the fifth DRB, a third RLC entity associated to the fifth DRB and a third logical channel associated to the fifth DRB, when the third RRC message indicates a full configuration and includes a fourth DRB configuration. That is, The UE releases the at least one of the third PDCP entity associated to the fifth DRB, the third RLC entity associated to the fifth DRB and the third logical channel associated to the fifth DRB, in response to the indication indicating the full configuration. The fourth DRB configuration includes a sixth DRB ID and the second EPS bearer ID. The UE adds a sixth DRB according to the fourth DRB configuration, and associates the sixth DRB to the EPS bearer. The UE communicates third data (e.g., transmits the third data and/or receives the third data) on the sixth DRB. The fifth DRB ID and the sixth DRB ID may be the same or different. A BS (e.g., the fourth BS or a fifth BS) may configure the fifth DRB by transmitting a fourth RRC message including a fifth DRB configuration, to the UE.

The third RRC message may include the second EPS bearer ID, and may not include a SDAP configuration. The fourth RRC message may include the second EPS bearer ID, and may not include a SDAP configuration. That is, the UE does not establish any SDAP entity in response to the third or fourth RRC message. The third RRC message may include a full configuration flag/indication indicating the full configuration. The fourth RRC message may or may not include the full configuration flag/indication.

In one example, the first network node is a Session Management Function (SMF) node, and the second network node is a Mobility Management Entity (MME), a serving gateway or a Packet Data Network (PDN) gateway. The above BSs may communicate with the UE via a LTE physical layer, a LTE media access control (MAC) layer, a LTE RLC layer and a LTE RRC layer. The above BSs may communicate with the UE via a LTE physical layer, a LTE MAC layer, a LTE RLC layer, a LTE RRC layer and a LTE PDCP layer or a NR PDCP layer. The above BSs may communicate with the UE via a NR physical layer, a NR MAC layer, a NR RLC layer, a NR RRC layer and a NR PDCP layer.

In one example, the DRB configuration (e.g., the first/second/third/fourth) DRB configuration may be a DRB-ToAddMod information element (IE). "OPTIONAL" means that a feature (e.g., parameter, variable or configuration) may or may not be included in the DRB-toAddMod. If the first RRC message does not indicate the full configuration, the UE reconfigures (e.g., modifies) the first DRB according to the first DRB configuration. If the UE receives a fifth RRC message which does not include the full configuration and includes a sixth DRB configuration including the first DRB ID and at least one of a SDAP configuration (e.g., sdap-Config), a PDCP reestablishment indication (e.g., reestablishPDCP) and a PDCP configuration (e.g., pdcp-Config), the UE reconfigures (e.g., modifies) the first DRB according to the sixth DRB configuration. In one example, the UE reconfigures the first DRB by reconfiguring the first PDCP entity associated to the first DRB according to the PDCP configuration or the PDCP reestablishment indication. In one example, the UE reconfigures the first DRB by reconfiguring the first SDAP entity associated to the first DRB according to the SDAP configuration. In one example, the UE reconfigures the first DRB by reconfiguring the first RLC entity associated to the first DRB according to a RLC configuration associated to the first DRB and included in the fifth RRC message. In one example, the UE reconfigures the first DRB by reconfiguring the logical channel associated to the first DRB according to a logical channel configuration associated to the first DRB and included in the fifth RRC message.

When an upper layer (e.g., Mobility Management or Session Management) receives an eps-BearerIdentity of released DRB(s), the upper layer locally deactivates an EPS bearer context identified by the eps-BearerIdentity. "The UE locally deactivates or releases the EPS bearer context" means that the UE deactivates or releases the EPS bearer context by itself without transmitting a message to notify the network or request the network to deactivate or release the EPS bearer context.

When an upper layer (e.g., Mobility Management, Session Management) receives PDU Session ID(s) of the released DRB(s), the upper layer does not locally deactivate (or release) PDU Session(s) identified by the PDU Session ID(s). When the upper layer receives a DRB ID or ID(s) of the released DRB(s), the upper layer does not locally deactivate (or release) PDU Session(s) identified by the PDU Session ID(s) and associated to the DRB(s) identified by the DRB ID or ID(s). That is, the UE keeps or maintains the PDU Session(s).

It should be noted that although the above examples are illustrated to clarify the related operations of corresponding processes. The examples can be combined and/or modified arbitrarily according to system requirements and/or design considerations. Names of message and IE described above are examples, and should not be treated as limitations on the invention. In some implantations, the RRC message described above may be a RRC Connection Reconfiguration message or a RRC Reconfiguration message, and the RRC complete message described above may be a RRC Connection Reconfiguration Complete message or a RRC Reconfiguration Complete message. In other implementations, the RRC message described above may be a RRC Connection Resume message or a RRC Resume message, and the RRC complete message described above may be a RRC Connection Resume Complete message or a RRC Resume Complete message.

Those skilled in the art should readily make combinations, modifications and/or alterations on the abovementioned steps, description and examples. Some steps described above may not be necessary for realizing the present invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214. For the process (es) involving the above BSs, the steps performed by the above BSs may be compiled into the program codes 214 of the above BSs.

To sum up, the present invention provides a method and related communication device for handling a full configuration. A UE releases a SDAP entity and continues communicating data associated to a PDU Session with a network on a DRB associated to the PDU session, when the UE receives a full configuration flag/indication. Thus, the problem of operations in response to the full configuration is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A user equipment (UE) for handling a full configuration, comprising:
   at least one storage device; and
   at least one processing circuit, coupled to the at least one storage device, wherein the at least one storage device stores, and the at least one processing circuit is configured to execute instructions of:
   establishing a packet data unit (PDU) session identified by a PDU session identity (ID) with a first network node;
   being configured with a first data radio bearer (DRB) identified by a first DRB ID and associated to the PDU Session or the PDU session ID, by a first base station (BS) connecting to the first network node;
   receiving a first radio resource control (RRC) message from the first BS, wherein the first RRC message indicates the full configuration and comprises a first DRB configuration, and the first DRB configuration comprises a second DRB ID and the PDU session ID;
   releasing a first service data adaptation protocol (SDAP) entity associated to the first DRB and releasing at least one of a first packet data convergence protocol (PDCP) entity associated to the first DRB, a first radio link control (RLC) entity associated to the first DRB and a first logical channel associated to the first DRB in response to the full configuration;
   adding a second DRB according to the first DRB configuration and associating the second DRB to the PDU session; and
   communicating first data on the second DRB.

2. The UE of claim 1, wherein the instructions further comprise:
   adding the second DRB according to the first DRB configuration by configuring a second SDAP entity associated to the second DRB and by configuring at least one of a second PDCP entity associated to the second DRB, a second RLC entity associated to the second DRB and a second logical channel associated to the second DRB.

3. The UE of claim 1, wherein the instructions further comprise:
   receiving a second RRC message configuring the first DRB from the first BS or a second BS, before receiving the first RRC message, wherein the second RRC message comprises a second DRB configuration comprising the first DRB ID and the PDU session ID;
   transmitting a RRC complete message to the first BS or the second BS, in response to the second RRC message;
   adding the first DRB according to the second DRB configuration and associating the first DRB to the PDU Session; and
   communicating second data associated with the PDU session with the first BS or the second BS on the first DRB.

4. The UE of claim 1, wherein the first RRC message comprises a full configuration flag indicating the full configuration.

5. The UE of claim 1, wherein the instructions further comprise:
   establishing an evolved packet system (EPS) bearer identified by an EPS bearer ID with a second network node;
   being configured with a third DRB identified by a third DRB ID and associated to the EPS bearer or the EPS bearer ID, by a third BS connecting to the second network node;
   receiving a third RRC message from the third BS;
   releasing at least one of a third PDCP entity associated to the third DRB, a third RLC entity associated to the third DRB and a third logical channel associated to the third DRB, when the third RRC message indicates another full configuration and comprises a third DRB configuration, wherein the third DRB configuration comprises a fourth DRB ID and the EPS bearer ID;
   adding a fourth DRB according to the third DRB configuration and associating the fourth DRB to the EPS bearer; and
   communicating third data on the fourth DRB.

6. A method of handling a full configuration for a user equipment (UE), the method comprising:
   establishing a packet data unit (PDU) session identified by a PDU session identity (ID) with a first network node;
   being configured with a first data radio bearer (DRB) identified by a first DRB ID and associated to the PDU Session or the PDU session ID, by a first base station (BS) connecting to the first network node;
   receiving a first radio resource control (RRC) message from the first BS, wherein the first RRC message indicates the full configuration and comprises a first DRB configuration, and the first DRB configuration comprises a second DRB ID and the PDU session ID;
   releasing a first service data adaptation protocol (SDAP) entity associated to the first DRB and releasing at least one of a first packet data convergence protocol (PDCP) entity associated to the first DRB, a first radio link control (RLC) entity associated to the first DRB and a first logical channel associated to the first DRB in response to the full configuration;
   adding a second DRB according to the first DRB configuration and associating the second DRB to the PDU session; and
   communicating first data on the second DRB.

7. The method of claim 6, further comprising:
   adding the second DRB according to the first DRB configuration by configuring a second SDAP entity associated to the second DRB and by configuring at least one of a second PDCP entity associated to the second DRB, a second RLC entity associated to the second DRB and a second logical channel associated to the second DRB.

8. The method of claim 6, further comprising:
   receiving a second RRC message configuring the first DRB from the first BS or a second BS, before receiving the first RRC message, wherein the second RRC message comprises a second DRB configuration comprising the first DRB ID and the PDU session ID;
   transmitting a RRC complete message to the first BS or the second BS, in response to the second RRC message;
   adding the first DRB according to the second DRB configuration and associating the first DRB to the PDU Session; and
   communicating second data associated with the PDU session with the first BS or the second BS on the first DRB.

9. The method of claim 6, wherein the first RRC message comprises a full configuration flag indicating the full configuration.

10. The method of claim 6, further comprising:
    establishing an evolved packet system (EPS) bearer identified by an EPS bearer ID with a second network node;
    being configured with a third DRB identified by a third DRB ID and associated to the EPS bearer or the EPS bearer ID, by a third BS connecting to the second network node;

receiving a third RRC message from the third BS;
releasing at least one of a third PDCP entity associated to the third DRB, a third RLC entity associated to the third DRB and a third logical channel associated to the third DRB, when the third RRC message indicates another full configuration and comprises a third DRB configuration, wherein the third DRB configuration comprises a fourth DRB ID and the EPS bearer ID;
adding a fourth DRB according to the third DRB configuration and associating the fourth DRB to the EPS bearer; and
communicating third data on the fourth DRB.

* * * * *